United States Patent
Van Nieuwenhuyze et al.

(10) Patent No.: US 11,700,520 B2
(45) Date of Patent: Jul. 11, 2023

(54) CONFIGURATION OF A NFC MOBILE TERMINAL

(71) Applicants: STMicroelectronics (Rousset) SAS, Rousset (FR); Proton World International N.V., Diegem (BE)

(72) Inventors: Olivier Van Nieuwenhuyze, Wezembeek-Oppem (BE); Alexandre Tramoni, Le Beausset (FR); Pierre Rizzo, Trets (FR)

(73) Assignees: STMicroelectronics (Rousset) SAS, Rousset (FR); Proton World International N.V., Diegem (BE)

( * ) Notice: Subject to any disclaimer, the term of this patent is extended or adjusted under 35 U.S.C. 154(b) by 0 days.

(21) Appl. No.: 17/122,789

(22) Filed: Dec. 15, 2020

(65) Prior Publication Data

US 2021/0195394 A1 Jun. 24, 2021

(30) Foreign Application Priority Data

Dec. 19, 2019 (FR) ...................... 1914912

(51) Int. Cl.
*H04W 4/80* (2018.01)
*H04W 4/029* (2018.01)
*H04W 76/11* (2018.01)
*H04W 84/12* (2009.01)

(52) U.S. Cl.
CPC ............ *H04W 4/80* (2018.02); *H04W 4/029* (2018.02); *H04W 76/11* (2018.02); *H04W 84/12* (2013.01)

(58) Field of Classification Search
CPC .............................. G06F 40/177; H04M 1/67

USPC .......................................... 455/405, 41.2, 411
See application file for complete search history.

(56) References Cited

U.S. PATENT DOCUMENTS

| | | | |
|---|---|---|---|
| 9,467,799 B2 | 10/2016 | Kim | |
| 9,826,364 B2 | 11/2017 | Iyengar et al. | |
| 10,312,976 B2 | 6/2019 | Chang et al. | |
| 10,419,907 B2* | 9/2019 | Redding | H04M 3/42178 |
| 2009/0111378 A1* | 4/2009 | Sheynman | H04W 4/80 455/41.1 |
| 2009/0247077 A1* | 10/2009 | Sklovsky | G06F 9/445 455/41.1 |
| 2012/0295588 A1 | 11/2012 | Chen et al. | |
| 2013/0023258 A1 | 1/2013 | Choi et al. | |
| 2013/0029693 A1 | 1/2013 | Bradley, Jr. et al. | |
| 2013/0076917 A1 | 3/2013 | Hill | |
| 2013/0295846 A1* | 11/2013 | Krutt | H04W 4/80 455/73 |
| 2014/0176306 A1 | 6/2014 | Lee et al. | |

(Continued)

*Primary Examiner* — Kiet M Doan
(74) *Attorney, Agent, or Firm* — Seed Intellectual Property Law Group LLP

(57) ABSTRACT

Devices and methods for configuration of a mobile terminal including a near-field communication device and a radio communication device separate from the near-field communication device are provided. One such method includes determining, by the radio communication device, an identifier of a wireless local network within a range of the mobile terminal. The method further includes selecting, from a configuration table, at least one configuration parameter of a plurality of sets of configuration parameters of the near-field communication device according to the identifier, and applying the at least one configuration parameter to the near-field communication device.

22 Claims, 1 Drawing Sheet

(56) References Cited

U.S. PATENT DOCUMENTS

| | | |
|---|---|---|
| 2014/0197927 A1 | 7/2014 | Kwon |
| 2014/0337492 A1 | 11/2014 | Dubs et al. |
| 2014/0364085 A1 | 12/2014 | Garcia |
| 2016/0065629 A1 | 3/2016 | Emoff |
| 2016/0295370 A1 | 10/2016 | Iyengar et al. |
| 2017/0048649 A1* | 2/2017 | Olgun ................ H01Q 7/04 |
| 2017/0311359 A1 | 10/2017 | Cho et al. |
| 2018/0027409 A1 | 1/2018 | Khanna et al. |
| 2018/0316573 A1 | 11/2018 | Marshall et al. |
| 2019/0102772 A1 | 4/2019 | Lerch et al. |
| 2019/0239106 A1 | 8/2019 | Cui et al. |
| 2020/0085385 A1 | 3/2020 | Nye et al. |
| 2020/0275635 A1 | 9/2020 | Deliou |
| 2020/0367471 A1 | 11/2020 | Deliou |
| 2021/0216991 A1 | 7/2021 | Grassadonia et al. |
| 2021/0280974 A1 | 9/2021 | Yum |
| 2021/0400744 A1 | 12/2021 | Chen et al. |

\* cited by examiner

CONFIGURATION OF A NFC MOBILE TERMINAL

BACKGROUND

Technical Field

The present disclosure generally concerns electronic devices and, in particular, electronic devices integrating electromagnetic transponders. The present disclosure more particularly concerns the configuration of a mobile terminal integrating a near-field communication device (NFC).

Description of the Related Art

Communication systems comprising electromagnetic transponders are more and more frequent, particularly since the development of near-field communication technologies according to the NFC forum.

Such systems use a radio frequency electromagnetic field emitted by a first device, called reader device, to communicate with another device, called card device.

Near-field communication systems enable to securely carry out various transactions, such as contactless payments, or also validations of tickets in public transport networks.

More and more, mobile terminals, such as cell phones, smart phones, or tablets, integrate a near-field communication device enabling to perform NFC transactions.

To ensure the interoperability and the compatibility of such mobile terminals with different applications, and to allow an optimal user experience, certain parameters of the near-field communication device are reconfigurable.

BRIEF SUMMARY

An embodiment aims at decreasing all or part of the disadvantages of known techniques of configuration of a mobile terminal integrating a near-field communication device.

Thus, an embodiment provides a method of configuration of a mobile terminal comprising a near-field communication device, the method comprising the steps of:

a) determining the geographic position of the mobile terminal;

b) selecting from a configuration table stored in an internal memory of the mobile terminal, a set of one or a plurality of parameters of configuration of the near-field communication device according to said geographic position; and c) applying the selected set of parameters to the near-field communication device.

According to an embodiment, the near-field communication device is integrated in a semiconductor chip.

According to an embodiment, the configuration table is stored in a memory of the mobile terminal, external to the semiconductor chip.

According to an embodiment, the configuration table is stored in a memory internal to the semiconductor chip.

According to an embodiment, at step a), the geographic position of the mobile terminal is determined from signals received by the near-field communication device from a near-field communication reader.

According to an embodiment, at step a), the geographic position of the mobile terminal is determined from satellite signals received by a satellite geolocation device of the mobile terminal.

According to an embodiment, at step a), the geographic position of the mobile terminal is determined from radio signals received by a radio communication device of the mobile terminal.

According to an embodiment, at step a), the geographic position of the mobile terminal is input by the user via a user interface of the mobile terminal.

According to an embodiment, the configuration table contains a plurality of sets of configuration parameters associated with different geographic positions.

According to an embodiment, the configuration table is updated during phases of update of the mobile terminal.

According to an embodiment, each set of parameters of the configuration table comprises one or a plurality of instructions for setting components for matching the antenna circuits of the near-field communication device.

According to an embodiment, each set of parameters of the configuration table comprises an identifier of a software application to be initiated on the mobile terminal to use the near-field communication device.

Another embodiment provides a mobile terminal comprising a near-field communication device, the terminal being configured to implement a configuration method such as defined hereabove.

Another embodiment provides a method of configuration of a mobile terminal comprising a near-field communication device and a radio communication device distinct from the near-field communication device, the method comprising the steps of:

a) determining, by means of the radio communication device, an identifier of a wireless local network within the range of the mobile terminal;

b) selecting, from a configuration table, a set of one or a plurality of parameters of configuration of the near-field communication device according to said identifier; and c) applying said at least one configuration parameter to the near-field communication device.

According to an embodiment, the wireless local network identified at step a) by means of the radio communication device is a WiFi, LoRaWAN, Sigfox, or Bluetooth network.

According to an embodiment, the wireless network identified at step a) by means of the radio communication device is a WiFi network, and the identifier is the SSID of the WiFi network.

According to an embodiment, the configuration table is stored in an internal memory of the mobile terminal.

According to an embodiment, the configuration table is stored on a server external to the mobile terminal and wherein, at step b), a connection is established between the mobile terminal and said external server.

According to an embodiment, the configuration table contains a plurality of sets of configuration parameters associated with distinct wireless local network identifiers.

According to an embodiment, the configuration table is updated during phases of update of the mobile terminal.

According to an embodiment, each set of parameters of the configuration table comprises one or a plurality of instructions for setting components for matching the antenna circuits of the near-field communication device.

According to an embodiment, each set of parameters of the configuration table comprises an identifier of a software application to be initiated on the mobile terminal to use the near-field communication device.

Another embodiment provides a mobile terminal comprising a near-field communication device and a radio communication device distinct from the near-field communication device, the terminal being configured to implement a method such as defined hereabove.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the circuits capable of implementing the described configuration methods have not been detailed, the described embodiments being compatible with usual circuits of a mobile terminal integrating a near-field communication device, or the forming of such circuits being within the abilities of those skilled in the art based on the functional indications of the present disclosure.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around", "approximately", "substantially" and "in the order of" signify within 10%, and preferably within 5%.

Figure 1:
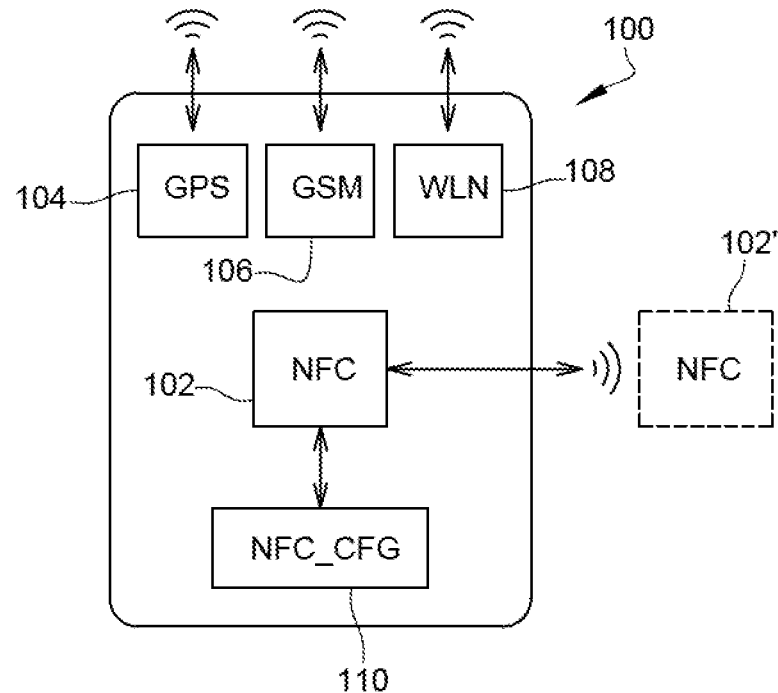
FIG. 1 schematically shows an example of a mobile device integrating a near-field communication device.

FIG. 1 very schematically shows an example of a mobile terminal 100, for example, a mobile phone, a smart phone, or a tablet, integrating a near-field communication device 102 (NFC), for example, according to the NFC forum.

Device 102 comprises transponder (not detailed in the drawing) capable of detecting an electromagnetic field radiated by another near-field communication device 102' (NFC), for example, at a frequency in the order of 13.56 MHz. The two NFC devices are then capable of communicating by near-field electromagnetic coupling.

According to applications, for a communication, one of the NFC devices operates in so-called reader mode while the other operates in so-called card mode, or the two devices communicate in peer-to-peer mode (P2P). Each NFC device comprises various electronic circuits (not detailed in the drawing), among which a circuit forming a near-field communication interface, or NFC interface, between the NFC device and the outside. Such an interface is used, among others, in reader mode, to generate a radio frequency signal transmitted by means of an antenna (not shown in the drawing) and, in card mode, to decode a captured radio frequency signal. The radio frequency field generated by one of the devices is detected by the other device, which is located within its range and which also comprises an antenna.

As an example, the NFC device 102 of mobile terminal 100 is capable of operating in card mode. The other NFC device 102' may be a fixed device, for example, a terminal for validating public transport tickets, capable of operating in reader mode.

In the example of FIG. 1, mobile terminal 100 further comprises a satellite geolocation device 104 (GPS). Mobile terminal 100 may further comprise a device 106 (GSM) of connection to a mobile telephony network, for example, a device compatible with GSM and/or 3G and/or 4G standards. Mobile terminal 100 may further comprise a device 108 (WLN) of connection to a wireless local network, for example, compatible with the WiFi (IEEE 802.11) and/or LoRaWAN and/or Sigfox and/or Bluetooth standards.

With the massive deployment of NFC readers, particularly in the field of public transport or of bank payment, the interoperability is not always guaranteed. In other words, it is possible for a mobile terminal integrating a NFC device not to operate optimally over all NFC readers available for sale. For example, in the field of public transport, the NFC readers of the transport networks of the different cities in the world, or even in a same country, may have different frequency behaviors and/or use different modulation schemes and/or have different impedances.

To improve the interoperability, certain parameters of NFC device 102 may be configurable. The techniques of configuration of the configurable parameters of a NFC device integrated to a mobile terminal are here more particularly considered.

Figure 2:
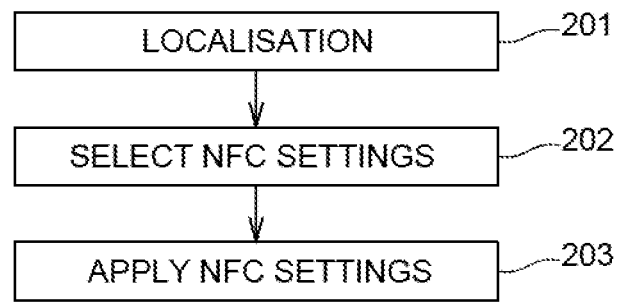
FIG. 2 is a logic diagram schematically illustrating an example of a method of configuration of a mobile terminal integrating a near-field communication device according to a first embodiment.

FIG. 2 is a logic diagram schematically illustrating an example of a method of configuration of a mobile terminal integrating a near-field communication device, for example, the terminal 100 of FIG. 1. This method may be implemented by using any adapted circuit for controlling the terminal, for example, a microcontroller (not detailed in FIG. 1).

The method of FIG. 2 comprise a step 201 (LOCATION) of determination of the geographic position of mobile terminal 100. The geographic position is for example determined by means of satellite signals received by the terminal geolocation device 104. As a variation, the geographic position may be determined by means of radio signals received by mobile telephony device 106 and/or by the device of connection to a wireless local network 108.

In another variation, the geographic position information may be directly transmitted by NFC reader 102', by near-field communication. An advantage is that this makes the method compatible with a terminal which would not have other wireless communication means than the NFC device, or where all the other wireless communication means other than the NFC device would be deactivated. For example, such a location mode may be useful when the mobile terminal is in airplane mode, or when the mobile terminal is used inside of an underground transport network (for example, the metro) where satellite and radio connections do not reach.

In another variation, the geographic position information may be delivered by the actual user, via a specific interface of the mobile terminal.

The geographic position information is for example provided in the form of a city and/or country identification code.

The method of FIG. 2 further comprises a step 202 (SELECT NFC SETTINGS) of selection of one or a plurality of parameters of configuration of the NFC device 102 of the mobile terminal, according to the geographic position information determined at step 201.

According to an aspect of the embodiment of FIG. 2, at step 202, the parameters of configuration of NFC device 102 depending on the geographic position are selected from a table 110 (NFC-CFG) (FIG. 1) stored in a memory of mobile terminal 100, for example, a non-volatile memory. Table 110 may contain a plurality of sets of specific configuration parameters associated with different geographic position codes. As an example, table 110 may contain a plurality of sets of specific configuration parameters associated with different cities. Configuration table 110 may for example be pre-filled on design of the mobile terminal. Configuration table 110 may further be updated during phases of update of the mobile terminal. During update phases, new values of the NFC configuration parameters may be transmitted to the mobile terminal by distant servers, for example via radio communication devices 106 and/or 108 of the mobile terminal, or also via the NFC communication device 102 of the mobile terminal, and then written into table 110. As an example NFC 102 is integrated in a semiconductor chip, called NFC chip, itself assembled on a printed circuit board of the mobile terminal. Table 110 may be stored in a general memory of the mobile terminal, external to the NFC chip, or directly in a memory internal to the NFC chip.

As a non-limiting example, the parameters depending on the geographic position of the terminal, stored in table 110, may comprise instructions for setting frequency matching and/or impedance matching components of the antenna circuits of NFC device 102, and/or parameters relative to the communication protocol to be implemented with the NFC reader and/or parameters relative to the coding format of the data exchanged with the NFC reader. The parameters depending on the geographic position of the terminal, stored in table 110, may further comprise values for setting the phase and/or the amplitude of a response signal (Active Load Modulation) sent back to the NFC reader. The parameters depending on the geographic position of the terminal may further comprise an identifier of the software application to be executed by the mobile terminal to implement NFC transactions. For example, different software applications may be required to use NFC device 102 in public transport networks of different cities. Table 110 may for example contain identifiers of the applications to be executed in different cities in the world or in a country.

The method of FIG. 2 further comprises a step 203 (APPLY NFC SETTINGS) of application, to NFC device 102, of the configuration parameters selected at step 202. As an example, when the configuration parameters selected at step 202 contain instructions for setting frequency matching and/or impedance matching components of the antenna circuits of NFC device 102, the instructions may be applied to the antenna circuits of device 102. When the parameters read from table 110 contain parameters relative to the communication protocol to be implemented with the NFC reader and/or parameters relative to the coding format of the data exchanged with the NFC reader, device 102 may be configured to implement the selected communication protocol and/or coding format. When the parameters read from table 110 contain an identifier of a software application to be executed by the mobile terminal to implement NFC transactions, the selected application may be initiated by the mobile terminal. This particularly enables to activate the application to be used when a plurality of applications of the same type are installed on the mobile terminal. For example, two transport networks of different cities may use the same technology (for example, MIFARE) with two different applications when they are managed/operated by different service providers. The activation of the appropriate application enables the terminal to be directly available for a transaction to come, thus avoiding an operation of application selection by the user.

An advantage of the embodiment of FIG. 2 lies in the fact that the configuration parameters of NFC device 102 depending on the geographic position of the mobile terminal are read from a memory internal to mobile device 100. In other words, it is not necessary to establish a connection with a distant device or server to obtain the parameters. This particularly enables to configure NFC device 102 even when no other wireless communication means of the mobile terminal are functional, for example, when the mobile terminal is used inside of an underground transport network where radio connections do not reach, or also when the user does not have a data communication credit in the geographic area where he/she is located or is out of credit.

Step 201 of determining the geographic position of the mobile terminal may for example periodically repeated. Steps 202 and 203 are for example implemented each time a change in geographic area is detected at the end of step 201.

Figure 3:
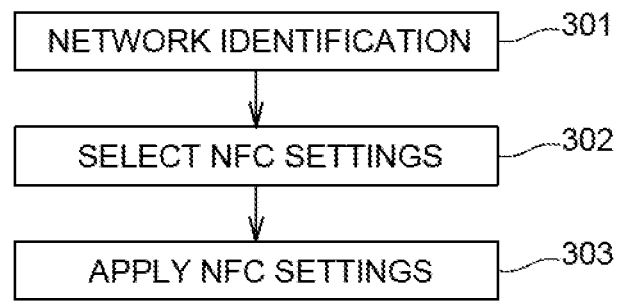
FIG. 3 is a logic diagram schematically illustrating an example of a method of configuration of a mobile terminal integrating a near-field communication device according to a second embodiment.

FIG. 3 is a logic diagram schematically illustrating another example of a mobile terminal configuration terminal integrating a near-field communication device. The method of FIG. 3 comprises steps common with the method of FIG. 2. In the following, only the differences with the method described in relation with FIG. 2 will be highlighted.

In the method of FIG. 3, the step 201 of geolocation of mobile terminal 100 implemented in the method of FIG. 2 is replaced with a network identification step 301 (NETWORK IDENTIFICATION). Step 301 is not an actual geolocation step but comprises identifying the NFC infrastructure in the vicinity of which mobile terminal 100 is located. For example, if the user is in a railway station, it will be attempted to identify the public transport organization to which the station belongs, without necessarily attempting to know the city or even the country where the station is located. Indeed, in many situations, the NFC configuration parameters to be applied to the mobile terminal depend more on the organization with which the user desires to make transactions than on the accurate geographic position of the mobile terminal.

At step 301, the communication device 108 of mobile terminal 100 is used to determine an identifier of a wireless local network within the range of mobile terminal 100. Preferably, device 108 is a WiFi communication module (IEEE 802.11 standard). The identifier determined at step 301 may be the SSID (Service Set Identifier) of a WiFi router within the range of mobile terminal 100. It should be noted that to determine the identifier, that is, the name of the wireless local network, it is not necessary for device 108 to establish an operational connection with network, but only for device 108 to be within the reachs of the radio waves of the network.

As an example, in a railway public transport network, it is more and more current for all the network (stations and trains) to be covered by a WiFi network implemented by the operator of the transport network. The identifier of the WiFi network (for example, the SSID) then enables to identify the transport network on which or close to which the mobile terminal is located.

The method of FIG. 3 further comprises a step 302 (SELECT NFC SETTINGS) of selection of one or a plurality of parameters of configuration of the NFC device 102 of the mobile terminal according to the wireless local network identifier detected at step 301.

Similarly to what has been described in relation with FIG. 2, the parameter(s) of configuration of NFC device 102 depending on the identifier of the wireless local network detected at step 301 may be selected from a table 110 (NFC CFG) (FIG. 1) stored in a memory of mobile terminal 110, for example, a non-volatile memory. Table 110 may contain a plurality of sets of specific configuration parameters associated with different wireless local network identifiers. As an example, table 110 may contain a plurality of sets of specific configuration parameters associated with different public transport networks. As in the example of FIG. 2, configuration table 110 may be prefilled on design of the mobile terminal, and/or be updated during phases of update of the mobile terminal.

As in the example of FIG. 2, the parameters stored in table 110 may comprise instructions for setting frequency matching and/or impedance matching components of the antenna circuits of NFC device 102, and/or parameters relative to the communication protocol to be implemented with the NFC reader and/or parameters relative to the coding format of the data exchanged with the NFC reader and/or an identifier of a software application to be executed by the mobile terminal to implement NFC transactions.

As a variation, in the embodiment of FIG. 3, instead of being stored in a memory internal to mobile terminal 100, table 110 may be stored on a server external to the mobile terminal. At step 302, the mobile terminal may then establish an electric connection with the external server, for example, by means of device 108 and/or of device 106, and download the NFC configuration parameters corresponding to the wireless local network identifier detected at step 301.

The method of FIG. 3 further comprises a step 303 (APPLY NFC SETTINGS), similar to the step 203 of FIG. 2, of application, to NFC device 102, of the configuration parameters selected at step 302.

An advantage of the embodiment of FIG. 3 is that it enables to simply determine the NFC configuration parameters to be applied to the mobile device, without passing through a phase of determination of the accurate geographic of the mobile terminal.

Various embodiments and variants have been described. Those skilled in the art will understand that certain features of these embodiments can be combined and other variants will readily occur to those skilled in the art. In particular, the selection of the operating frequencies of the NFC device depends on the application.

Moreover, the described embodiments are not limited to the examples of mobile terminals mentioned hereabove. More generally, the described embodiment may apply to all types of connected mobile equipment, for example, connected watches.

Further, the described embodiments are not limited to the examples of settable parameters of the NFC device described hereabove. The described embodiments more generally apply to any settable NFC device configuration parameter, for example, a voltage for powering control circuits of the NFC device.

Finally, the practical implementation of the described embodiments and variations is within the abilities of those skilled in the art based on the functional indications given hereabove. In particular, it will be within the abilities of those skilled in the art to implement circuits and/or software capable of implementing the above-described configuration methods.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of configuration of a mobile terminal, the method comprising:
   determining, by a radio communication device of a mobile terminal, an identifier of a wireless local network within a range of the mobile terminal, the mobile terminal including a near-field communication device and the radio communication device within the mobile terminal, the radio communication device being separate from the near-field communication device, the wireless local network different from an near-field communication infrastructure adjacent to the mobile terminal and corresponding to the near-field communication infrastructure adjacent to the mobile terminal;
   selecting, from a configuration table, at least one configuration parameter of a plurality of sets of configuration parameters of the near-field communication device that correspond to the near-field communication infrastructure adjacent to the mobile terminal according to the identifier,
   wherein each set of parameters of the configuration table includes an identifier of a software application to be initiated on the mobile terminal to use the near-field communication device; and
   applying the at least one configuration parameter to the near-field communication device.

2. The method according to claim 1, wherein the wireless local network is a WiFi, LoRaWAN, Sigfox, or Bluetooth network.

3. The method according to claim 2, wherein the wireless local network is a WiFi network, and wherein the identifier is a Service Set Identifier (SSID) of the WiFi network.

4. The method according to claim 1, wherein the configuration table is stored in an internal memory of the mobile terminal.

5. The method according to claim 1, wherein the configuration table is stored on a server external to the mobile terminal, the method further comprising:
   establishing a connection is between the mobile terminal and the external server.

6. The method according to claim 1, wherein the configuration table contains a plurality of sets of configuration parameters associated with identifiers of distinct wireless local networks.

7. The method according to claim 1, wherein the configuration table is updated during phases of update of the mobile terminal.

8. The method according to claim 1, wherein each set of parameters of the configuration table includes one or a plurality of instructions for setting components for matching antenna circuits of the near-field communication device.

9. The method according to claim 1, wherein each set of parameters of the configuration table includes instructions for setting frequency or impedance matching of a signal emitted by the near-field communication device.

10. A mobile terminal, comprising:
a near-field communication device within the mobile terminal; and
a radio communication device within the mobile terminal and separate from the near-field communication device, the mobile terminal being configured to:
determine, by the radio communication device, an identifier of a wireless local network within a range of the mobile terminal, the wireless local network different from a aft near-field communication infrastructure adjacent to the mobile terminal and corresponding to the near-field communication infrastructure adjacent to the mobile terminal;
select, from a configuration table, at least one configuration parameter of a plurality of sets of configuration parameters of the near-field communication device that correspond to the near-field communication infrastructure adjacent to the mobile terminal according to the identifier,
wherein each set of parameters of the configuration table includes an identifier of a software application to be initiated on the mobile terminal to use the near-field communication device; and
apply the at least one configuration parameter to the near-field communication device.

11. The mobile terminal according to claim 10, wherein the wireless local network is a WiFi, LoRaWAN, Sigfox, or Bluetooth network.

12. The mobile terminal according to claim 11, wherein the wireless local network is a WiFi network, and wherein the identifier is a Service Set Identifier (SSID) of the WiFi network.

13. The mobile terminal according to claim 10, wherein the configuration table is stored in an internal memory of the mobile terminal.

14. The mobile terminal according to claim 10, wherein the configuration table is stored on a server external to the mobile terminal.

15. The mobile terminal according to claim 10, wherein the configuration table contains a plurality of sets of configuration parameters associated with identifiers of distinct wireless local networks.

16. The mobile terminal according to claim 10, wherein the configuration table is configured to be updated during phases of update of the mobile terminal.

17. The mobile terminal according to claim 10, wherein each set of parameters of the configuration table includes one or a plurality of instructions for setting components for matching antenna circuits of the near-field communication device.

18. The mobile terminal according to claim 10, wherein each set of parameters of the configuration table includes instructions for setting frequency or impedance matching of a signal emitted by the near-field communication device.

19. A system, comprising:
a mobile terminal including:
a geolocation device configured to determine a geographic position of the mobile terminal, the geographic position corresponding to a near-field communication infrastructure adjacent to the mobile terminal;
a first near-field communication device within the mobile terminal; and
a radio communication device within the mobile terminal;
wherein the mobile terminal is configured to:
select, from a configuration table, at least one configuration parameter of a plurality of sets of configuration parameters of the near-field communication device that corresponds to the near-field communication infrastructure adjacent to the mobile terminal based on the determined geographic position of the mobile terminal,
wherein each configuration parameter of each set of configuration parameters of the configuration table includes an identifier of a software application to be initiated on the mobile terminal to use the first near-field communication device; and
apply the at least one configuration parameter to the near-field communication device.

20. The system of claim 19, wherein the mobile terminal comprises at least one of a mobile phone, a smart phone, or a tablet.

21. The system of claim 19, wherein the mobile terminal is configured to select the at least one configuration parameter after the geolocation device detects a change in the geographic position of the mobile terminal.

22. The system of claim 19, wherein the configuration table is updated during phases of update of the mobile terminal.

* * * * *

UNITED STATES PATENT AND TRADEMARK OFFICE
CERTIFICATE OF CORRECTION

| | |
|---|---|
| PATENT NO. | : 11,700,520 B2 |
| APPLICATION NO. | : 17/122789 |
| DATED | : July 11, 2023 |
| INVENTOR(S) | : Olivier Van Nieuwenhuyze et al. |

It is certified that error appears in the above-identified patent and that said Letters Patent is hereby corrected as shown below:

In the Claims

Column 9, Claim 10, Line 18:
"from a aft near-field"
Should read:
--from a near-field--.

Signed and Sealed this
Twelfth Day of September, 2023

Katherine Kelly Vidal
*Director of the United States Patent and Trademark Office*